United States Patent [19]
Thomson et al.

[11] Patent Number: 5,315,706
[45] Date of Patent: May 24, 1994

[54] HIGH SPEED IEEE 488 BUS INTERFACE SYSTEM AND METHOD

[75] Inventors: Andrew C. Thomson, Austin; Brian K. Odom, Pflugerville; C. Paul Butler, Austin; Michael G. Jablin, Austin; William C. Nowlin, Jr., Austin; Robert W. Canik, Cedar Park, all of Tex.

[73] Assignee: National Instruments Corporation, Austin, Tex.

[21] Appl. No.: 889,596

[22] Filed: May 27, 1992

[51] Int. Cl.$^5$ ............................................. G06F 13/00
[52] U.S. Cl. .................................. 395/200; 364/240.3; 364/240.5; 364/239.4; 395/250; 395/275; 395/325
[58] Field of Search ............... 395/200, 250, 275, 325; 364/240.3, 240.5, 239.4

[56] References Cited

U.S. PATENT DOCUMENTS

| | | | |
|---|---|---|---|
| 4,507,740 | 3/1985 | Star et al. | 364/200 |
| 4,710,893 | 12/1987 | McCutcheon et al. | 364/900 |
| 4,982,325 | 1/1991 | Tignor et al. | 364/200 |
| 5,109,490 | 4/1992 | Arimilli et al. | 395/325 |

OTHER PUBLICATIONS

"IEEE Standard Digital Interface for Programmable Instrumentation"; ANSI/IEEE Std 488.1-1987; Jun. 16, 1988 (Revision of ANSI/IEEE Std. 488-1978).

Primary Examiner—Arthur G. Evans
Assistant Examiner—D. Smith
Attorney, Agent, or Firm—Flehr, Hohbach, Test, Albritton & Herbert

[57] ABSTRACT

A modified IEEE 488.1 bus interface increases, by as much as a factor of eight, the rate at which inter-instrument data transfers can be performed. The bus interface state machines presented in the ANSI/IEEE Std 488.1-1987 have been modified so that if all the devices involved in a particular data transfer are equipped to handle high speed data transfers, then a modified data transmission methodology is used so as to enable multi-line messages to be transmitted at a higher speed than would otherwise be possible. If any of the devices involved in a particular data transfer does not have an interface equipped to handle high speed data transfers, this condition is automatically detected by the interfaces with high speed capability, and then the standard data transmission methodology is used. The high speed data transmission mode is totally transparent to the controller software in that it does not require any changes to the controller software nor to the device drivers and device application programs.

21 Claims, 10 Drawing Sheets

HIGH SPEED IEEE 488 BUS INTERFACE SYSTEM AND METHOD

The invention relates generally to automated test and measurement systems that use ANSI IEEE Standards 488.1 and 488.2 for communication between controllers and instruments. In particular, the invention relates to a system and method of increasing the speed at which data can be transmitted between devices, wherein the high speed transmission mode is automatically invoked when all the devices involved in a data transfer are capable of the higher speed transmission.

BACKGROUND OF THE INVENTION

Microprocessors are used today for performing the internal operations of modern instruments. Additionally, computers and microprocessors are used to control test and measurement systems. The primary method used for interconnecting and communicating between instruments and control computers (controllers) is the IEEE 488 bus.

The IEEE 488 bus is essentially an electrical signal transmission bus with a predefined set of lines. A set of predefined protocols govern the methodology for transferring information over the bus from a controller to specified devices, and vice versa. By using an industry standard bus, the manufacturers of a wide variety of instruments can ensure that standard software packages and interface circuits can be used to connect their instruments to microprocessor based controllers. That is, purchasers of these instruments do not need to buy a different customized controller for each instrument, because all such instruments use the same set of signal lines and the same set of communication protocols.

IEEE 488-1978, as well as the newer IEEE 488.1-1987 standard, defines a data settling time, T1, that is used by all devices (instruments and controllers) that source "multiline" messages (i.e., messages containing multiple bits transmitted parallel) onto the IEEE 488.1 bus. IEEE Standards 488-1978 and 488.1-1987 allow different values for T1, depending on the configuration of the system and on the type of data line drivers used by the device performing the source handshake. The maximum multiline data transfer rate that is compatible with these standards is 1 megabyte per second. However, advances in instrumentation are making this data transfer rate limitation a bottleneck in terms of inter-instrument communication. The inventors of the present invention believe that there is a need for an inter-instrument communication standard that can achieve higher data transfer rates. The present invention provides a backwards-compatible modification of the IEEE 488.1 bus standard that can achieve data transfer speeds of up to 8 megabytes per second.

SUMMARY OF THE INVENTION

In summary, the present invention provides a system and method for implementing specific IEEE 488.1 interface functions that dramatically improve the rate at which inter- instrument data transfers can be performed. In particular, the bus interface state machines presented in the ANSI/IEEE Std 488.1-1987 have been modified so that if all the devices involved in a particular data transfer are equipped to handle high speed data transfers, then a modified data transmission methodology is used so as to enable multiline messages to be transmitted at a higher speed than would otherwise be possible. If any of the devices involved in a particular data transfer does not have an interface equipped to handle high speed data transfers, this condition is automatically detected by the interfaces with high speed capability, and then the standard data transmission methodology is used. The high speed data transmission mode is totally transparent to the controller software in that it does not require any changes to the controller software nor to the device drivers and device application programs.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
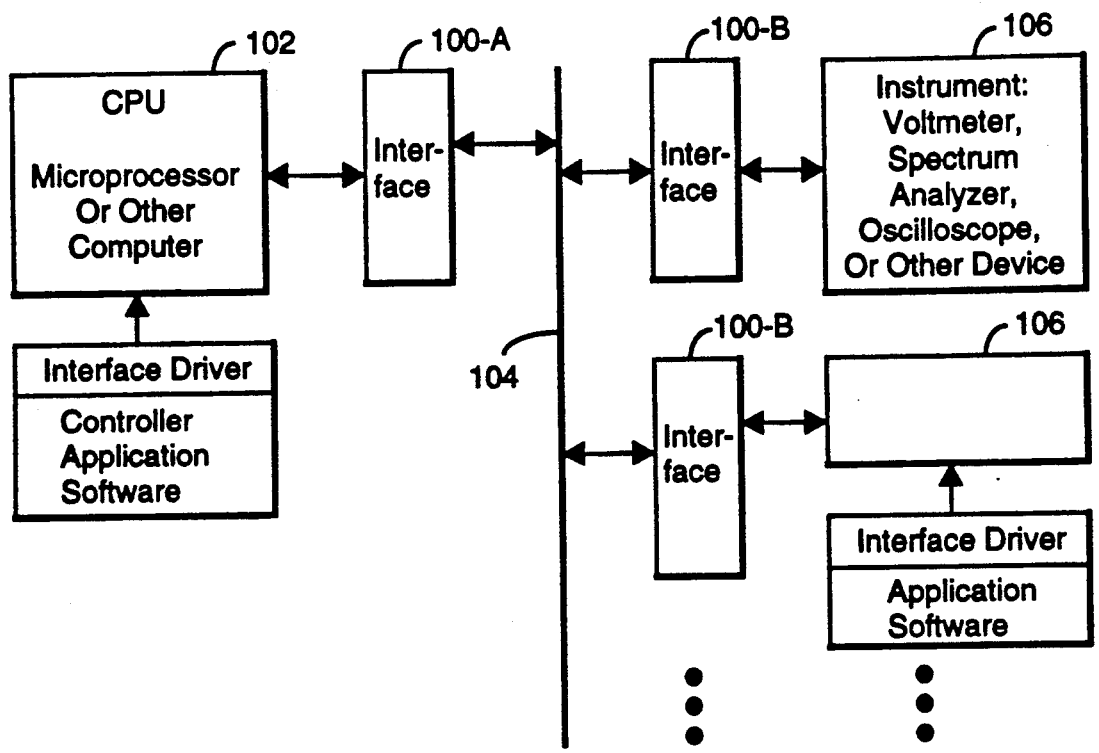
FIG. 1 is a block diagram of a controller coupled to one or more devices via an IEEE 488 interface.

Referring to FIG. 1, there is shown a controller interface 100-A which couples a microprocessor controller 102 to an IEEE 488 bus 104, which in turn is coupled by device interfaces 100-B to one or more devices 106, such as digital voltmeters, spectrum analyzers, oscilloscopes, or any other instrument which is designed to send and receive commands and messages via an IEEE 488 bus. As will be explained in more detail below, the controller interface 100-A and device interfaces 100-B are almost identical, except that the controller interface has some additional logic, associated with the transmission of commands to other devices, not needed in device interfaces.

It is important to note that in a single system some of the device interfaces 100-B can be "high speed capable" (meaning that they incorporate the present invention), while other ones of the device interfaces 100-B are not. When this is the case, the high speed data transmission mode of the present invention is used only when all the devices involved in a particular data transfer are high speed capable. It is also important to note that k is possible for a single "sourcing device" (a device that is transmitting data) to send data to two or more "acceptor devices" (devices that receive the transmitted data) simultaneously. If any of the acceptor devices are not high speed capable, the normal multiline data transmission mode is used.

The IEEE 488 bus 104 is also called the "GPIB" (general purpose interface bus).

Whenever a signal or signal line name begins with the letter "N", it is a negative logic signal or signal line. In the Figures and in the description below, the symbol "~" means a logical NOT, the symbol "∨" means a logical OR, and the symbol "∧" means a logical AND. Some signal lines of the GPIB are labelled "~Nxxx", indicating double negative logic, in which case the signals can be considered to be positive logic signals. Most other GPIB signal lines use negative logic, meaning that they are true when low and false when high.

The following convention is used with regard to symbols written using uppercase and lowercase letters: bus lines (e.g., DAV for data valid and ATN for attention) on the GPIB and the names of states (e.g., SIDS, SGNS, etc. in the source handshake state machine) in the interface's various state machines are denoted with upper case letters, while local messages generated and used only internal to the interface (e.g., "nba" for new byte available, and "pon" for power on) are denoted with lowercase letters.

Figure 2:
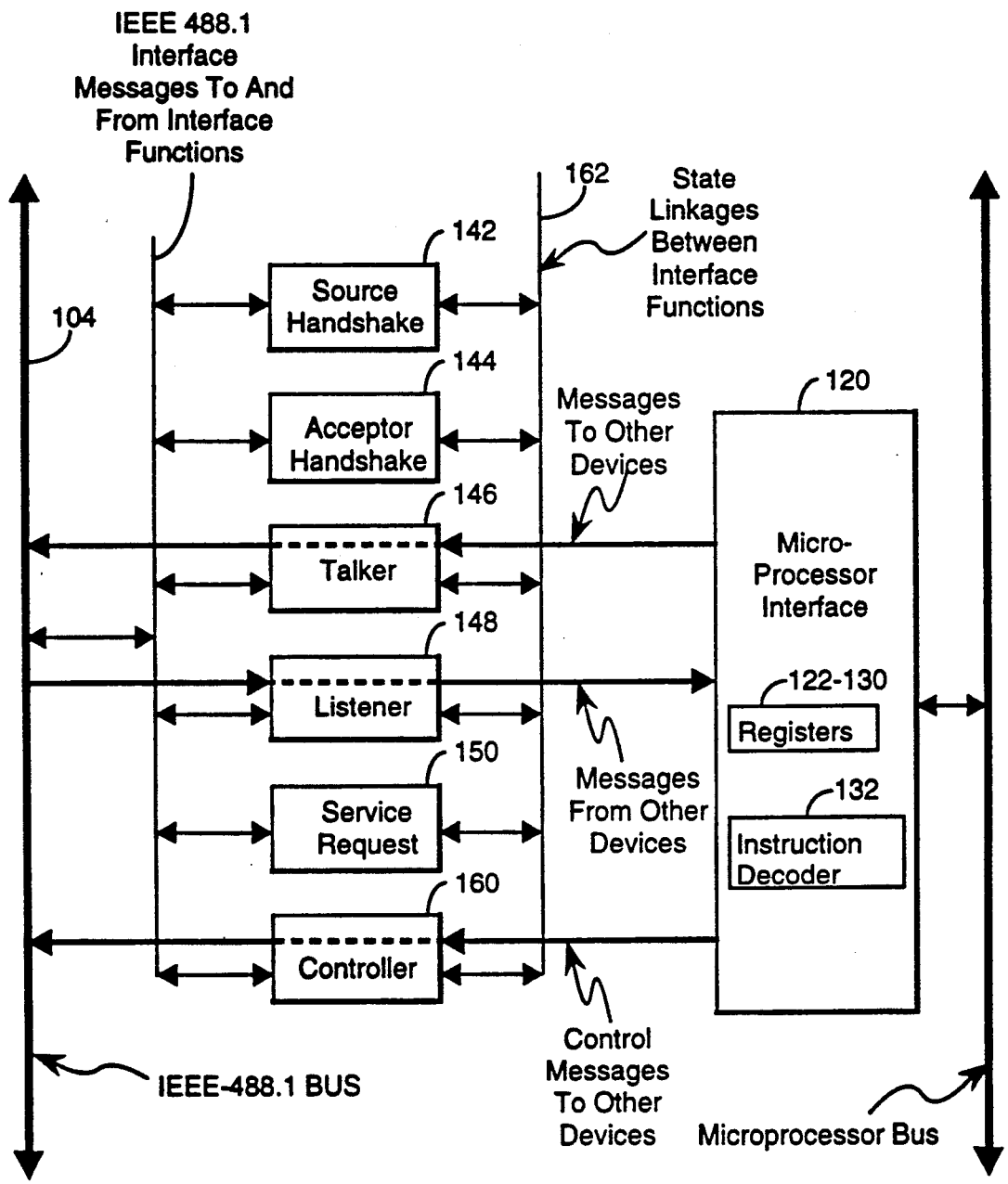
FIG. 2 is a block diagram of the primary components of a controller interface in accordance with the present invention.

Referring to FIG. 2, the controller interface 100 in accordance with the present invention includes two "ports": a microprocessor port 120 and an IEEE 488 bus 104. It should be understood that most instruments have an embedded microprocessor or micro-controller, and that therefore the same basic interface architecture is used for both controller interfaces 100-A and instrument interfaces 100-B. In some instances the instrument may be controlled by hard-wired logic circuits, but since these are equivalent to a microprocessor for the purposes of the present invention, the invention will be described from the viewpoint of having a microprocessor controller coupled to port 120. Thus the interface 100 is a general purpose circuit for coupling either an instrument or a controller to the IEEE 488 bus 104. an instrument or a controller to the IEEE 488 bus 104.

Figure 3:
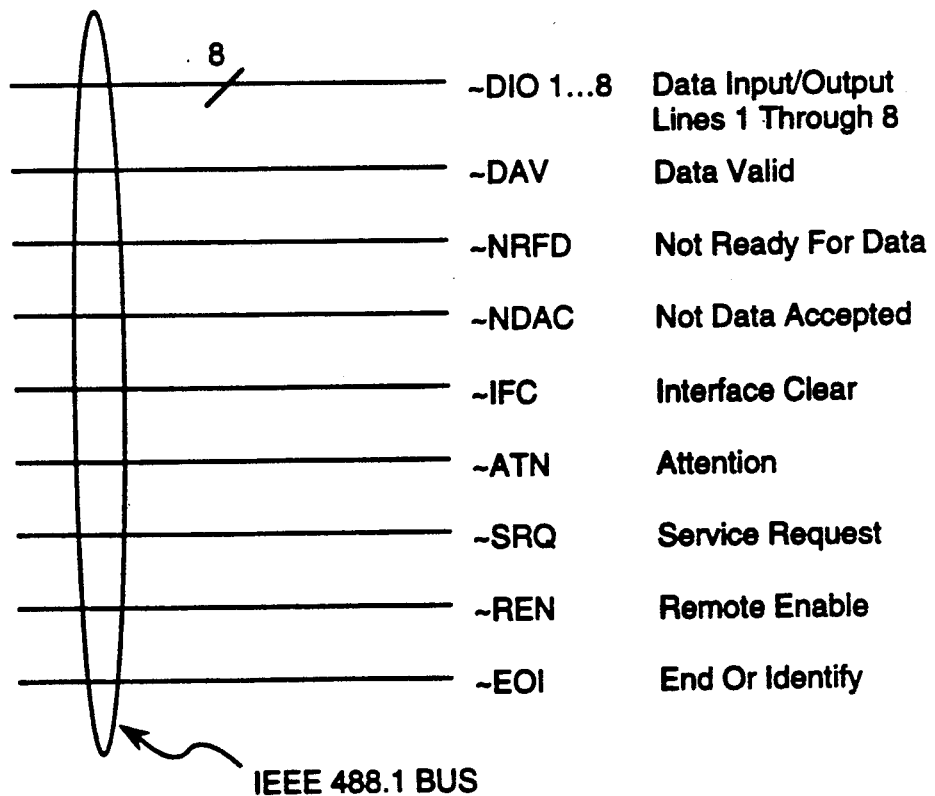
FIG. 3 depicts the signal lines of an IEEE 488 bus.

The structure of the IEEE 488 bus 104 is shown in FIG. 3. As shown, it has the following lines:

1) ~DIO1-8, an eight bit data bus.
2) ~NRFD (not ready for data) line which is asserted low so as to temporarily prevent the assertion of new data on the bus 104. More specifically, the assertion of the DAV (data valid) signal is prevented.
3) ~DAV (data valid) line, which is asserted when a byte of data has been asserted on the bus.
4) ~NDAC (not data accepted) line, which is asserted low when the device receiving a byte of a message has not accepted the byte. When several devices are reading a broadcast message, DAC becomes true only when the slowest device has accepted delivery of the byte.
5) ~IFC (interface clear) line, which is asserted low to reset a number of device interface functions (i.e., state machines in the interface).
6) ~ATN (attention) line, asserted low by the controller before "addressing" one or more of the devices on the IEEE 488 bus. When ATN is asserted a device address is asserted on the data bus. ATN is false during multiline data transfers.
7) ~SRQ (service request) line, asserted low by devices when they need to be serviced by the controller.
8) ~REN (remote enable) line, used by the controller to instruct devices on the IEEE 488 bus to begin responding to commands from the controller.
9) ~EOI (end or identify) line: "end" is used to mark the last byte in a multiline message, and "identify" is used by a controller when identifying devices requesting service.

The ~NRFD and ~NDAC signal lines on the GPIB are open collector type signal lines that are terminated with pull-up resistors. When no device is asserting or driving ~NRFD or ~NDAC, that line carries a high signal because R is pulled high by its pull up resistor(s). When any device wishes to assert ~NRFD or ~NDAC, it either pulls down or releases these signal lines in order to assert low and high signals on the bus. In some instances, such as when there is more than one acceptor device receiving data, several devices may initially pull down the ~NRFD line and then release that signal line to indicate completion of particular task. When all the acceptor devices release the ~NRFD or ~NDAC signal lines, the signal line rises to a high signal level which is then detected by the controller or other sourcing device.

For convenience, the GPIB signal lines will often be referred to herein without including the "~" at the beginning of the signal name.

Figure 4:
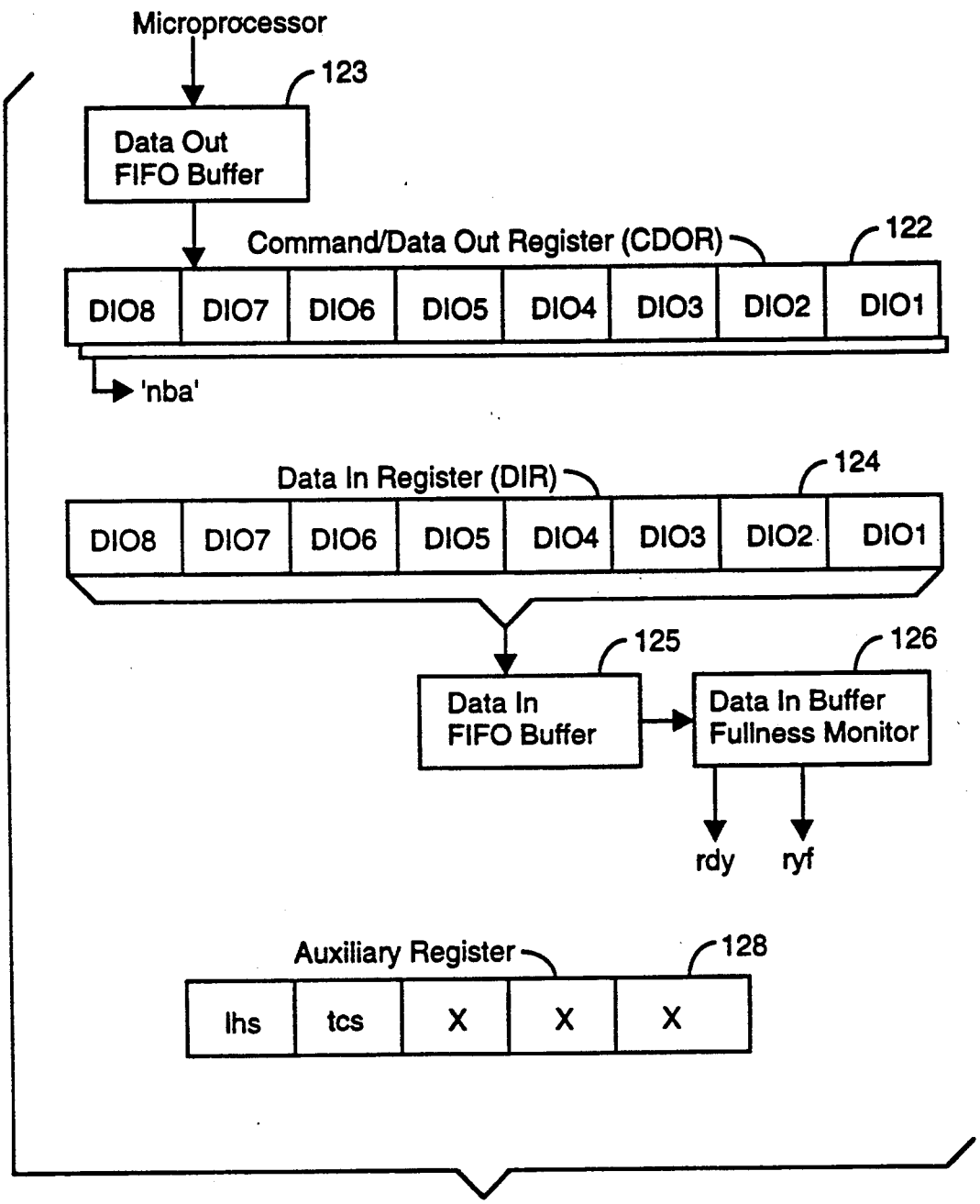
FIG. 4 depicts some of the registers in the microprocessor port of the interface of the present invention.

Microprocessor port 120 contains a set of addressable data registers 122, 124, 128 for defining the interface's mode of operation, and for storing commands and messages being transmitted to and from the IEEE 488 bus 104. Referring to FIG. 4, the data registers in port 120 include an eight bit Command/Data Out Register (CDOR) 122 which is the general purpose register used for forwarding multiline data messages (from either a controller or other device), and multiline commands from a controller, to the IEEE 488 bus 104. The microprocessor 102 in the associated device can queue up a series of multiline messages to be transmitted by the interface by storing those messages in a Data Out FIFO buffer 123 (or other equivalent buffering device) that supplies the CDOR 122 with a new byte of data each time that the current byte in the CDOR 122 is transmitted.

Similarly, there is an eight bit Data In Register (DIR) 124, which is used by the microprocessor 102 to receive data and message bytes from other devices on the IEEE 488 bus 104. In the preferred embodiment, data received by the DIR 124 is shifted into a Data In FIFO Buffer 125 (or other equivalent buffering device) so that a sequence of data bytes can be received and stored by the interface, allowing the microprocessor 102 to retrieve several bytes at a time message "rdy" when the Data In FIFO Buffer 125 has room for at least one more byte of data, and produces a "ready for four bytes" message "ryf" when the Data In FIFO Buffer 125 has room for at least four more bytes of data.

An Auxiliary Register 128 is used for functions not normally required by the IEEE 488 standard. The only values in the Auxiliary register relevant to the present invention are the "lhs" (leave high speed) bit flag which is set when the controller software or an instrument's interface driver or application software executes a command to force the GPIB to leave the "high speed" data transmission mode, and the "tcs" (take control synchronously) bit flag that is set by the controller when it wants to take control of the GPIB.

The control circuitry for the CDOR 122 (see FIG. 2) generates a local message, 'nba' (new byte available), which is true whenever a new byte of data is written into the CDOR.

Referring once again to FIG. 2, the microprocessor port 120 also includes an instruction decoder 132 which decodes address, data and read/write signals from the microprocessor bus to generate local commands. Local command signals, generated by other arts of the interface, that are relevant to the present invention include: "pon" (power on reset) generated by the interface power supply, "rdy" (ready for next message) and "ryf" (read for four bytes), generated by the Data In Buffer, "tcs" (take control synchronously) generated by the interface's controller function 160, and "lhs" (leave high speed mode) which is an Auxiliary Register signal.

The Source Handshake state machine 142 is used when "sourcing" messages or data to the bus 104. "Sourcing" means that data is being sent from the microprocessor (which may be part of the controller or part of an instrument) to another device coupled to the GPIB 104.

The Acceptor Handshake state machine 144 is used when accepting (i.e., receiving) multiline messages from a device on the GPIB 104.

The Talker state machine 146 is used to control the transmission of device specific data messages to devices on the GPIB 104. The Talker state machine 146 generates a State value of TACS when the Talker state machine 146 is active, meaning that the associated device is in a data transmission mode of operation. The Talker state machine generates a state value of SPAS (serial poll active state) when the associated device is in a status reporting mode of operation.

The Listener state machine 148 is used to control the reception of device specific data messages from devices on the GPIB 104.

The Service Request state machine 150 asserts the signal SRO on the IEEE 488 bus to request services from the active bus controller.

The Controller state machine 160 determines when the Source Handshake State Machine 142 is used to send interface messages (e.g., trigger, clear, and addressing messages) to devices on the GPIB 104. The Controller state machine 160 also handles service requests by devices on the GPIB 104. The Controller state machine 160 is present only in the interface 100-A for a bus controller, and is not present in the interfaces 100-B for instruments. The Controller state machine 160 generates a State value of CACS (controller active state) when the bus controller is sending, or about to send, commands to the other devices on the GPIB. It also generates a state value of CTRS (controller transfer state) when it is transferring control to another device on the GPIB and is thus in the process of becoming idle.

The state machines shown in FIG. 2 are interconnected by internal busses and signal lines 162 so that each state machine can use signals from the others. In the preferred embodiment, the state machines 142, 144, 146, 148, 150, 160 of the interface 100 are implemented using electronic (e.g., gate array) circuits that shift from state to state in accordance with predefined logic rules that specify combinations of signals, states and timing requirements that must be met in order for a state machine to shift from one state to another.

BASIC DESCRIPTION OF HIGH SPEED DATA TRANSFER MODE

Figure 5:
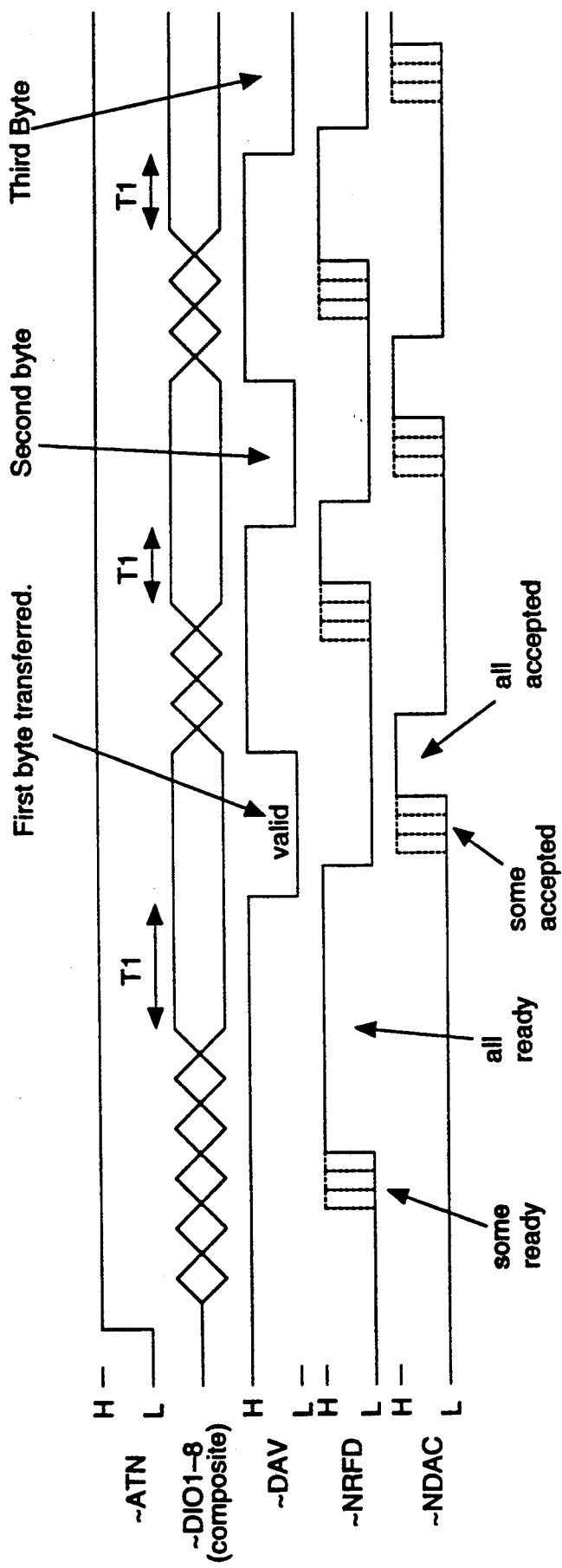
FIG. 5 is a timing diagram for normal multiline data transmission via the IEEE 488 bus.

Referring to FIG. 5, during normal speed multiline data transfers, the sequence of events for transmission of data is as follows. Prior to the data transmission, the controller sends command messages to the transmitting device (also called the "sourcing" device) and the receiving devices (also called the acceptors or the accepting devices) instructing them as to their respective roles during the next data transfer. Then the controller deasserts ATN, which signals the sourcing device that it can begin data transmission. For each byte of data to be sent, the source device first asserts a data value on the D101-8 lines, and after the data value on D101-8 is stable, the sourcing device must hold the signals on the data lines steady for a specified settling period before asserting the data valid signal DAV.

Prior to the time that the sourcing device asserts data values on the D101-8 lines, each of the accepting devices asserts NRFD, indicating that it is not ready to receive data, until it is ready to receive the next byte of data. Since any single device can pull the NRFD line low, k is only when all the accepting devices are ready to receive data, that the NRFD line goes high. The sourcing device must wait until the NRFD line goes high before asserting the data valid signal DAV. After the data valid signal DAV is asserted, the first acceptor device to notice the assertion of DAV sets the NRFD line low to indicate that it is no longer ready, and then accepts the transmitted data, at which point it releases the data accepted line NDAC.

The NDAC line is held low by the accepting devices until they have all successfully latched in the transmitted byte of data. Since any single accepting device can pull the NDAC line low, it is only when all the accepting devices have accepted the transmitted data that the NDAC line goes high. When the sourcing device detects that the NDAC line has gone high, R then releases the data valid line DAV and begins the next data byte transmission cycle by asserting new data values on the D101-8 lines.

Figure 6:
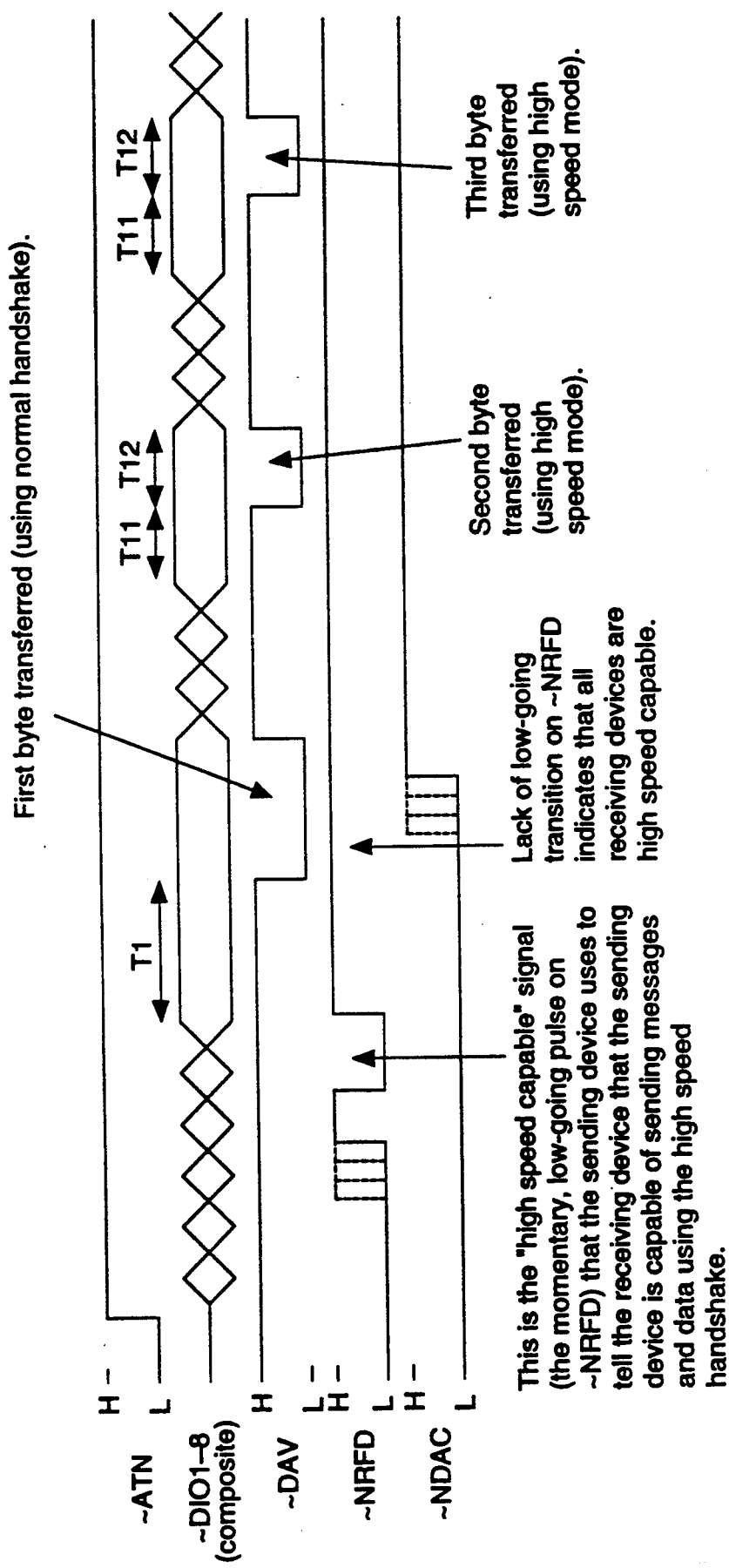
FIG. 6 is a timing diagram for transmitting data in a high speed mode via the IEEE 488 bus.

Referring to FIG. 6, the present invention changes the multiline data transmission sequence as follows. Normally, after all the acceptor devices have released the not ready for data line NRFD, the NRFD line is allowed to stay high until the sourcing device asserts a data valid signal on the DAV line. In the present invention, if the sourcing device is "high speed capable" (meaning that it incorporates the present invention), it sends a "single line message", herein called the "high speed message", to all the acceptor devices by pulling the NRFD line low before asserting data valid. This special message will be recognized by acceptor devices that are "high speed capable", and will be ignored by any acceptor devices that are not high speed capable.

During transmission of the first byte of data, each acceptor device that is high speed capable and that received the "high speed message" from the source device refrains from pulling the NRFD line low. After the assertion of DAV, as during normal multiline data transmissions, all acceptor devices release the NDAC line after accepting the first byte of data. If any acceptor device is not high speed capable, R will operate normally and therefore it will pull the NRFD line low when it receives the data valid signal DAV.

If none of the acceptor devices pulls the NRFD line low after DAV is asserted, that means that all the acceptor devices are high speed capable. The sourcing device monitors the NRFD line to determine whether it is pulled low, and if none of the acceptor devices pulls the NRFD line low, subsequent bytes of the data transfer are transmitted using the high speed data transfer method. In particular, the sourcing device releases the data valid line DAV, letting it go high, while new data values are asserted on the D101-8 lines and for a specified settling time, and then pulls the data valid line DAV low for a predefined interval during which the acceptor devices must read the transmitted byte of data. The timing intervals for asserting data and for asserting data valid are preset by the sourcing device, and do not depend on acknowledgement signals from the acceptor devices. During transmission of all the bytes after the first byte, the acceptor devices leave the NRFD and NDAC lines in a high state.

Generally, acceptor devices have input buffers 125 (see FIG. 4), sometimes implemented using FIFO (first in first out) buffer circuits, from which the received data is read and processed. If any acceptor's input buffer is on the verge of overflowing, its interface 100-B can stop the high speed data transfer mode by pulling the ~NDAC line low. Because of the maximum allowed length (20 meters) and the maximum allowed capacitive loading of the GPIB, plus the maximum speed at which high speed transfers can take place, it is possible for up to two or three bytes of data to be in the midst of transmission at any one time. To provide some additional safety margin, in the present invention each acceptor device must include Data In Monitoring circuitry (circuit 126 in FIG. 4) for detecting when its Data In Buffer 125 is not ready to accept at least four bytes of additional data then deasserting its internal local "ryf" (ready for four bytes) message, which in turn causes the interface's Acceptor Handshake state machine 144 to assert a low signal on the ~NDAC line.

When the sourcing device detects that the ~NDAC line has been pulled low in the midst of a high speed data transfer, R interrupts data transmission until such time that none of the acceptor devices assert a low signal on the ~NDAC line, at which point the sourcing device will continued to source data using high speed data transmission mode. Any acceptor device can leave high speed mode by using the "lhs" (leave high speed) local message and asserting the ~NDAC line, in which case the sourcing device can continue to transmit data using the normal interlocked handshake mode until ATN asserts and unasserts again or until the "lhs" local message becomes false.

DETAILED DESCRIPTION OF HIGH SPEED DATA TRANSFER MODE

Figure 7:
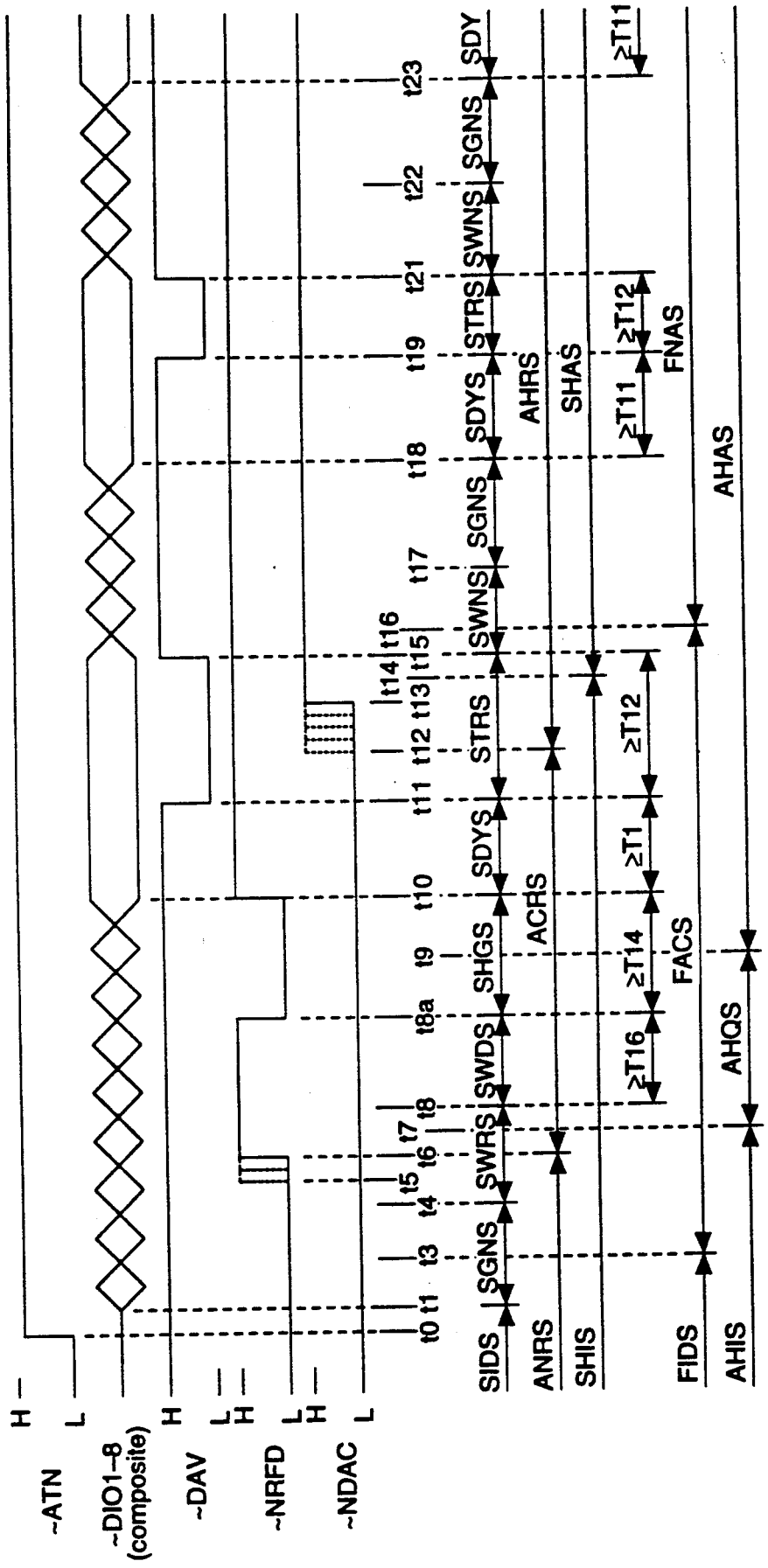
FIG. 7 is another timing diagram showing state transitions in the Source Handshake state machine and in the Acceptor Handshake state machines associated with high speed data transfers.

FIG. 7 shows a detailed timing diagram that also depicts the states of the Source Handshake and Acceptor Handshake state machines, as well as certain timing parameters. Reference will be made to FIG. 7 while explaining the operation of the Source Handshake and Acceptor Handshake state machines of the present invention.

Internally to the state machines of the interface, a number of internal signals are used that reverse the logic convention of the GPIB signals, while others preserve the logic convention of the GPIB signals. In particular, the DAC (data accepted) message is true when the ~NDAC signal line is high, and RFD (ready for data) is true when ~NRFD is high. DAV (data valid) is true when ~DAV is low, and ATN is true when ~ATN is low.

SOURCE HANDSHAKE STATE MACHINE

Figure 8A:
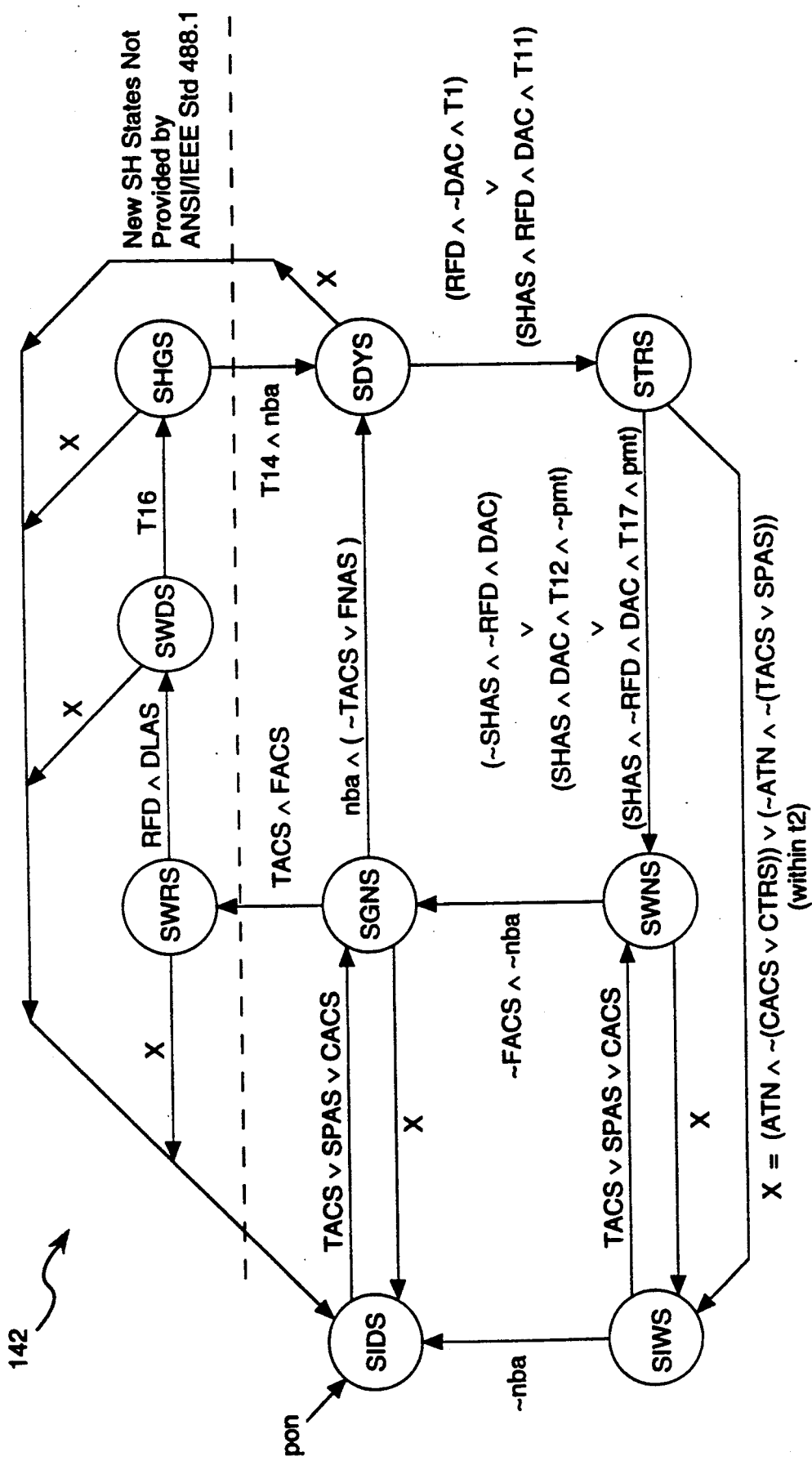
FIGS. 8A, 8B and 8C show the state diagrams for the Source Handshake function.
Figure 8B:
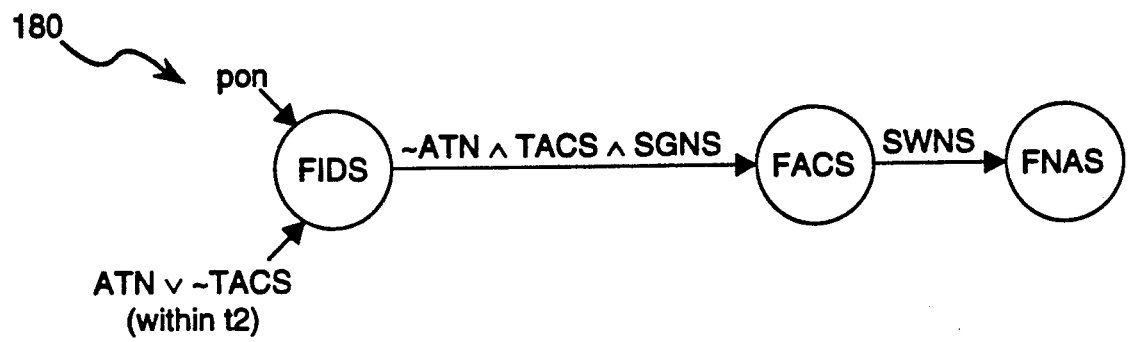
Figure 8C:
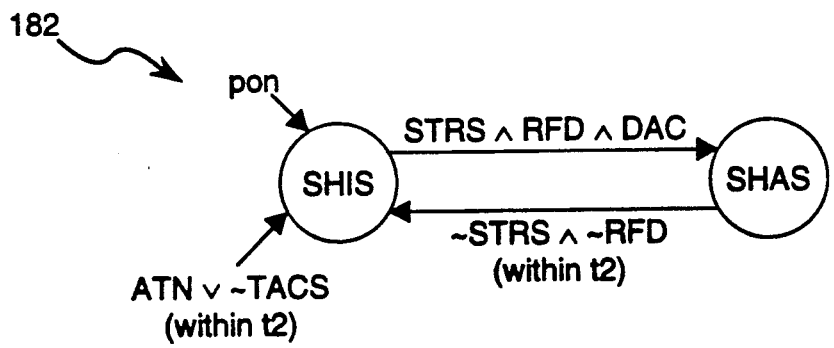

The Source Handshake state machine 142, herein called the Source Handshake function, provides a device with the capability of transferring multiline messages to other devices. The Source Handshake of the present invention differs from the state diagram shown in the IEEE 488.1 Specification in that it provides two alternate versions of the source handshake function: the normal SH function and the SH function extended for non-interlocked multiline data message transfers, hereinafter called the SHE (source handshake extended) function. The extended source handshake state diagram for the preferred embodiment is shown in FIGS. 8A, 8B and 8C. The Source Handshake Extended state machine 142 makes use of two subsidiary state machines: the First Data Byte state machine 180 shown in FIG. 8B and the High Speed state machine 182 shown in FIG. 8C.

In the prior art devices, an interlocked handshake sequence between the SH function of one device's interface and the acceptor handshake (AH) function of one or more other device's interface(s) guarantees asynchronous transfer of a multiline message. In the SHE state machine of the present invention, the transfer is not fully interlocked during high speed data transfers.

When all devices involved in a particular data transfer are high speed capable, the sequence of SHE function states during transmission of the first data byte is:

SIDS→SGNS→SWRS→SWDS→SHGS→SDYS→STRS→SWNS→SGNS

The SWRS and SHGS states are used to transmit the high speed capable message to the acceptor devices over the NRFD line. Regardless of whether the acceptor devices are high speed capable or not, the sequence of SHE function states during transmission of the subsequent data bytes is:

SGNS→SDYS→STRS→SWNS→SGNS

However, the timing of the data transmission sequence for the subsequent data bytes is controlled by interlocking source and acceptor handshake signals when any of the acceptor devices is not high speed capable, while the timing of the data transmission sequence for the subsequent data bytes is controlled by delay intervals T11 and T12 programmed into the source device if all the acceptor devices are high speed capable (see Table of State Transition Timing Values).

All references below to time values, such as t1, t3, t7 and so on, refer to the detailed timing diagram of FIG. 7. Note, however, that "t2" is a delay time specified by the ANSI/IEEE Std 488.1, and therefore t2 is not used to refer to an event time in the timing diagram of FIG. 7.

| TABLE OF STATE TRANSITION TIMING VALUES | | | |
|---|---|---|---|
| Time Value Identifier | Function (applies to) | Description | Value |
| T11 | SH | settling time for high speed multiline msgs | ≧75 ns |
| T12 | SH | hold time for high speed multiline msgs | ≧50 ns |
| T13 | AH | "leave high speed" delay | ≧1 μs |
| T14 | SH | "high speed capable" message pulse width | ≧250 ns |
| T15 | AH | delay after ATN goes false | ≧250 ns |
| T16 | SH | delay to allow all acceptors to notice RFD true | ≧250 ns |
| T17 | SH | delay to allow high speed acceptors the opportunity to leave high speed mode | ≧250 ns |

Source Idle State (SIDS); In SIDS the Source Handshake function is disabled. The Source Handshake function powers on in SIDS. The Source Handshake function exits SIDS at time t1 (see FIG. 7) and enters the source generate state (SGNS) whenever the interface 100 is in a state (Talker Active State (TACS), Serial Poll Active State (SPAS), or Controller Active State (CACS)) where it needs to source bytes onto the GPIB 104. The Source Handshake function returns to SIDS within t2 if none of these states is active (t2 is specified and defined in IEEE Std 488.1). The high speed capability of the extended source handshake function is invoked only when the source device is in Talker Active State (TACS).

Source Generate State (SGNS): In SGNS the interface 100 is driving the data byte in the CDOR onto the DIO lines of the GPIB 104, but is waiting for either a command byte, data byte, or serial poll response to become available before issuing a new byte available ('nba') message. At time t4 the Source Handshake function goes from SGNS to the source wait for RFD state SWRS (for high speed data messages) or the source delay state SDYS when the local message 'nba' becomes true. The state transition to SWRS or SDYS depends on the state of the First Data Byte state machine 180 shown in FIG. 8B.

First Data Byte State Machine: The purpose of the First Data Byte state machine 180 in FIG. 8B is to distinguish between the first data byte and subsequent data bytes of a multiline message. The First Data Byte state machine 180 powers on in first data byte idle state (FIDS). This state machine exits FIDS and enters the first data byte active state (FACS) (e.g., at time t3) whenever the attention signal (ATN) is false (indicating that a data transfer is taking place), the Talker state machine is in Talker Active State (TACS), and the Source Handshake state machine is in the SGNS state. The First Data Byte state machine shifts to the first data byte not active state (FNAS) at t16 when the Source Handshake function is in the SWNS state, which occurs after the first byte of a message has been transmitted and the data valid signal DAV has been deasserted. The First Data Byte state machine 180 remains in the FNAS state until the ~ATN signal line is asserted by the controller and/or the Talker state machine is no longer in TACS. It returns to the FIDS state within t2 upon ATN becoming true or TACS becoming false.

High Speed State Machine: Referring to FIG. 8C, the High Speed state machine 182 powers on in source high speed inactive state (SHIS). This state machine is used to monitor whether or not all acceptors are high speed capable. The state machine 182 exits SHIS and enters the source high speed active state (SHAS) (at t14 in FIG. 7) whenever the Source Handshake function is in the source transfer state (STRS), and both DAV (data valid) and RFD (ready for data) are true. Note that in the IEEE 488.1 standard specification, RFD and DAV are never both true. When both of these signals are simultaneously true and the Source Handshake is in STRS, this indicates that all the acceptor devices are high speed capable, and therefore the High Speed state machine 182 shifts to the source high speed active state (SHAS). The High Speed state machine reverts back to the high speed inactive state (SHIS) with t2 when either (A) the source handshake function is not in STRS and RFD is false (which indicates that one of the acceptor devices has asserted that it is not ready for data), or (B) upon ATN becoming true or TACS becoming false.

Source Delay State (SDYS): When the first data byte of a multiline message has already been transmitted (indicated by FNAS being true), and the new byte available "nba" local message is true, the Source Handshake Extended state machine shifts from SGNS to the source delay state SDYS (at t18 in FIG. 7). This state transition also occurs when the new byte available "nba" local message is true and the Talker Active State (TACS) is false, indicating that a command message is being transmitted or that the Talker state machine is in SPAS (serial poll active state).

If the first data byte has not been transmitted, FACS will be true, and the SHE function will leave SGNS and go to SWRS (at t4 in FIG. 7).

The SHE function leaves SDYS (at time t11) and enters the source transfer state (STRS) after a delay of T1 if the ~NRFD line is high and the ~NDAC line is low. Alternately, if source high speed mode SHAS is active, the SHE function leaves SDYS (at time t19) and enters the source transfer state (STRS) after a delay of T11 if both the ~NRFD and ~NDAC lines are high.

Source Transfer State (STRS): In STRS the SHE function is asserting DAV (the ~DAV line is pulled low by the source device), indicating that the data on the GPIB DIO lines is valid. If the SHE function is in high speed mode (SHAS is true), DAC is true, and the byte being sourced is not a program message terminator, the SHE function leaves STRS (at time t21) and enters the source wait for new cycle state (SWNS) automatically after a delay of T12. If the SHE function is not in high speed mode (SHAS is false), the SHE function leaves STRS and enters the source wait for new cycle state (SWNS) (at time t15) when the DAC (data accepted) message is true (~NDAC line is high) and the RFD (ready for data) message is false (~NRFD line is low).

If the SHE function is in high speed mode (SHAS is true), and the byte being sourced is a program message terminator ("pmt"), then the state machine will wait in STRS for T1 7 to allow the high speed acceptor(s) time to leave acceptor high speed mode and enter the normal handshake sequence. As will be explained in more detail below with reference to FIGS. 9A-9D, the high speed acceptor state sequence while the SHE function waits in STRS for this case is:

AHRS→ACTS→ACRS→ACDS

Once the acceptor reaches ACDS, RFD will be false and DAC will be true, which allows the SHE function to proceed to SWNS.

The program message terminator "pmt" signifies the end of a data message, and could be an application or device specific byte, such as a line feed character, or any data byte accompanied by the IEEE 488.1 END single line message (~EOI asserted with a data byte).

Source Wait for New Cycle State (SWNS): In SWNS the SHE function releases the data valid ~DAV line. The purpose of the SWNS state is to wait for the sourcing device to start a new message generation cycle. The SHE function leaves the SWNS state (at t17) and enters the SGNS state when the local new byte available message 'nba' becomes false.

Source Idle Wait State (SIWS): The SHE function enters the SIWS state from SWNS or STRS within t2 if (A) the source device is not the controller and ATN is asserted (ATN ∧ ~(CACS ∨ CTRS)) or (B) if ATN is deasserted and the source device is in neither Talker Active State (TACS) nor serial poll active state (SPAS).

In SIWS the SHE function is not active in the external message byte transfer process, and instead waits for the source device to start a new message cycle. SIWS allows a sequence of message byte transfers to be interrupted without loss of data over the interface while at the same time the device may continue to prepare for the next message byte generation cycle. The SHE function exits SIWS and (A) enters SIDS if the local nba message is false, or (B) returns to SWNS if TACS, SPAS or CACS is true.

Source Wait for RFD State (SWRS): When the first data byte of a multiline message is about to be transmitted, as indicated by the FACS state, the SHE function transitions from the SGNS state to SWRS (at t4). In SWRS the SHE function is waiting for all acceptor devices to indicate their readiness to accept the first data byte since the most recent transition of the ~ATN line to inactive. In SWRS the SHE function keeps the ~DAV line inactive (high) and waits for RFD to become true. To ensure that all acceptors have had sufficient time to notice that the ATN message is true, the SHE function also waits until DLAS becomes true before leaving SWRS and proceeding to SWDS (at t8 in FIG. 7).

Source Wait for Delay State (SWDS): After detecting RFD true while in SWDS, the SHE function delays for T16 before proceeding to make sure that all high speed capable acceptors have sufficient time to notice that the ~NRFD line is high. After the delay, the SHE function leaves SWDS and enters SHGS.

Source High speed capable Generate State (SHGS): In SHGS the SHE function indicates to all acceptor devices that it is capable of sourcing bytes using the high speed non-interlocked handshaking methodology of the present invention. It does this by asserting ~NRFD low for a time period of T14 (which is at least 250 nanoseconds long). The SHE function exits SHGS and enters SDYS after a time period of T14 (at t10) and "nba" is true. Alternately, the SHE function exits SHGS and enters SIDS if (A) the ATN message is true and neither CACS nor CTRS is active (indicating that transmission of the message is being interrupted by a control message from the bus controller) or (B) the ATN message is false and neither TACS nor SPAS is active (indicating that the Talker has become inactive for some reason).

ACCEPTOR HANDSHAKE STATE MACHINE

Referring to FIGS. 9A-9D, the Acceptor Handshake Extended state machine 144, herein called the Acceptor Handshake Extended (AHE) function, provides a device with the capability of transferring multiline messages to other devices. The AHE state machine (also called the AHE function) of the present invention differs from the state diagram shown in the IEEE 488.1 Specification in that it provides for two alternate versions of the acceptor handshake function: the normal AH function and the AH function extended for non-interlocked multiline message transfers. The AHE state diagram for the preferred embodiment is shown in FIGS. 9A-9D. The AHE state machine 144 makes use of three subsidiary state machines: a high speed recognition state machine 190 shown in FIG. 9B, a related state machine 192 shown in FIG. 9C for delaying the operation of the high speed recognition state machine at the start of a new data message generation cycle, and a subsidiary state machine 194 shown in FIG. 9D for accepting data bytes in the high speed non-interlocked mode.

Figure 9A:
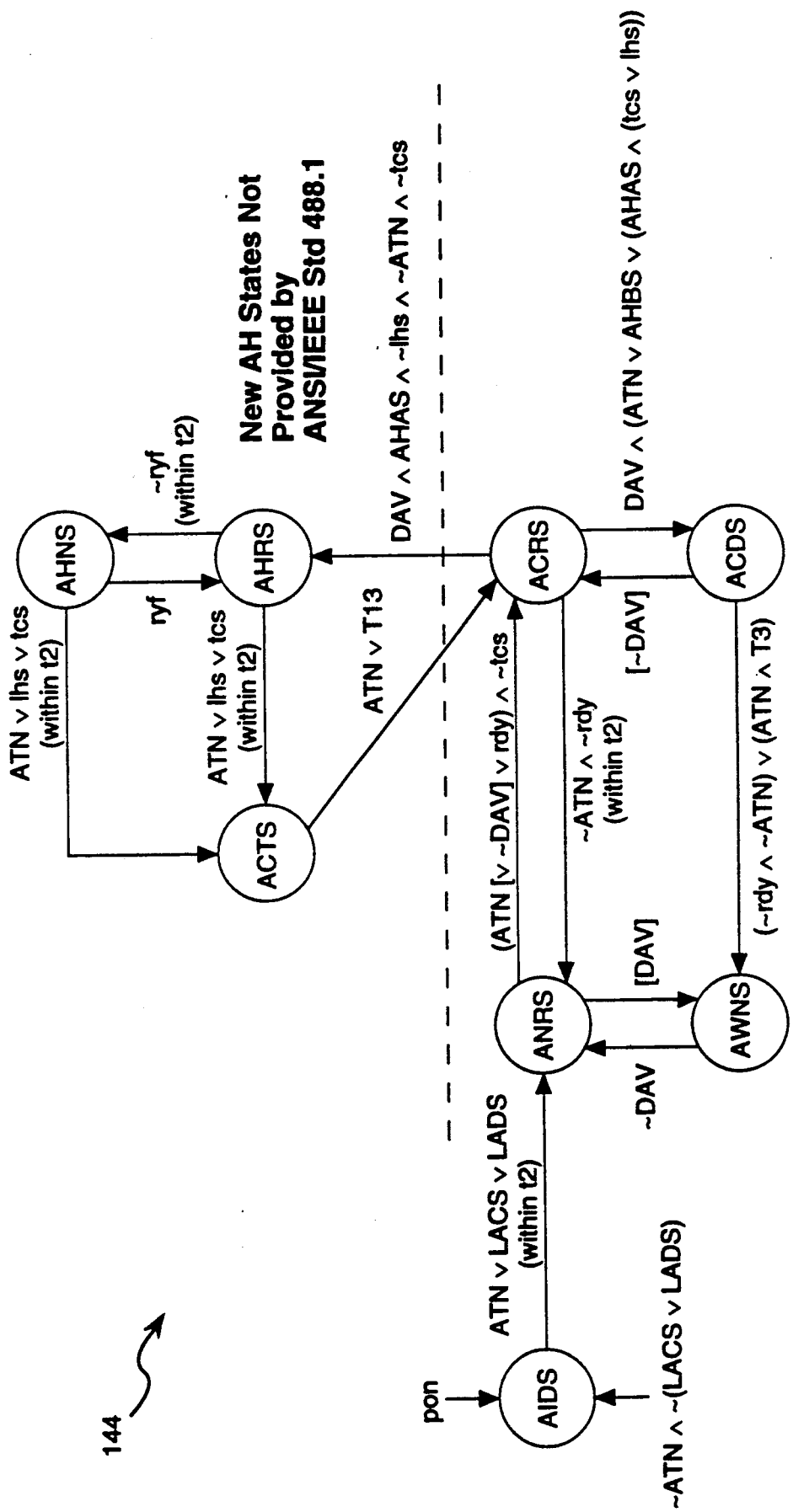
FIGS. 9A, 9B, 9C and 9D show the state diagrams for the Acceptor Handshake function.

Referring to FIG. 9A, when any of the devices involved in a particular data transfer are not high speed capable, the sequence of AHE function states during transmission of the message byte is:

AIDS→ANRS→ACRS→ACDS→AWN→ANRS where the sequence ANRS→ACRS→ACDS→AWNS→ANRS repeats for each data byte received.

When all of the devices in a data transfer are high speed capable, the sequence of AHE function states is:

AIDS→ANRS→ACRS→AHRS

All data bytes are accepted while the AHE function remains in the AHRS state. If the acceptor device's input buffer is on the verge of overflowing, up to four additional data bytes are accepted in the AHNS and ACTS states, while the acceptor device asserts the ~NDAC line low to stop the source device from sending any additional data.

The following chart lists the outputs and actions of each of the AHE states.

| STATE | RFD | DAC | Other Actions |
|-------|-----|-----|---------------|
| AIDS | (T) | (T) | Acceptor Handshake is idle |
| ANRS | F | F | RFD Holdoff State |
| ACRS | (T) | F | Ready To Accept Data |
| ACDS | F | F | Acceptor Capture Data State. Latch data into the DIR. If ATN is true, commands decoded and appropriate interrupts set. |
| AWNS | F | (T) | Waiting for DAV to unassert (new cycle to begin) |
| AHRS | (T) | (T) | Accept High Speed Ready State. Latch data into DIR in coordination with transitions of DAV. The acceptor device is prepared to receive at least four multiline messages. |
| AHNS | (T) | F | Accept High Speed Not Ready State. The acceptor device is not prepared to receive at least four multiline data messages, but continues to accepts multiline messages while in AHNS. |
| ACTS | (T) | F | Accept High Speed Terminate State. After a short delay (T13) the acceptor device will accept multiline messages using interlocked handshaking. |

Referring to FIGS. 9A-9D, the Acceptor Handshake Extended function of the present invention is implemented as follows.

Acceptor Idle State (AIDS): In AIDS the Acceptor Handshake function is disabled. The Acceptor Handshake function powers on in AIDS. The Acceptor Handshake function exits AIDS and enters the Acceptor Not Ready State (ANRS) whenever ATN is asserted or the Listener function 148 is in the Listener Addressed State (LADS) or in the Listener Active State (LACS), which basically means that the Listener function has been or is in the process of being activated.

Acceptor Not Ready State (ANRS): In ANRS, the AHE function asserts both ~NRFD and ~NDAC low, indicating to the sourcing device that the acceptor is not ready for data and has not accepted data. The AHE function waits in this state until the local message "tcs" (take control synchronously) is not true and either the ~ATN line is asserted low or the local message "rdy" is true, at which point AHE transitions to the Acceptor Ready State (ACRS).

Acceptor Ready State (ACRS): In ACRS the AHE function asserts ~NDAC low and releases the ~NRFD line to indicate that the acceptor is ready for data. In accordance with the interlocked handshake mode of operation, if the acceptor is not in high speed mode (as indicated by the AHBS state of state machine 190 being true, or ATN being true, or state machine 190 being in AHAS when the "lhs" local message or the "tcs" local message is true) then the AHE function transitions to Accept Data State (ACDS) when the data valid signal DAV becomes true. If the acceptor is in high speed mode (as indicated by the AHAS state of state machine 190 being true) then the AHE function transitions to Acceptor High Speed Ready State (AHRS) when the DAV (data valid) message becomes true, but only if the local message "lhs" (leave high speed mode) is false and the local message "tcs" (take control synchronously) is false.

Accept Data State (ACDS): In ACDS the AHE function asserts ~NRFD low (to indicate that it is not ready to receive any further data) and latches the data on the DIO lines into the DIR register. From ACDS the AHE function transitions to the Acceptor Wait for New Cycle State (AWNS) when either the local message "rdy" is false and ATN if false, or if ATN is true after a wait of duration T3 (specified in ANSI/IEEE Std 488.1-1987). Generally, the local message "rdy" goes false temporarily after each data byte is received until the data byte is transferred either to an internal data in buffer (as shown in FIG. 4) or to the associated device's microprocessor.

Acceptor Wait for New Cycle State (AWNS): In AWNS the AHE function waits for DAV to be deasserted by the sourcing device, which indicates the end of the current data transfer cycle and the beginning of the next cycle, at which point the AHE function transitions to ANRS (described above).

Acceptor High Speed Ready State (AHRS): When the acceptor is in high speed mode, as indicated by AHAS being true, all data bytes are accepted while the AHE function remains in the AHRS state. If the acceptor device's data in buffer has less than four bytes of available space, the local message "ryf" goes false and the AHE function transitions to the Acceptor High Speed Not Ready State (AHNS). Otherwise, the AHE function remains in AHRS until the end of the data message is received, at which time ATN will be asserted, causing the AHE subsidiary state machines 190 and 192 to leave the high speed mode of operation, or the "lhs" message will become true.

The AHE function will leave AHRS and enter ACTS if ATN becomes true, if the "leave high speed" local message becomes true, or if the "take control synchronously" local message becomes true. If ATN becomes true when AHRS is active, the AHE function must leave high speed mode (within t2) in order to be able to accept command bytes using the normal handshake.

The "lhs" local message may become true when AHRS is active if the byte being received is a program message terminator ("pmt") and the acceptor wants to hold off the handshake on this last data byte. To accomplish the holdoff, 1) the AHE function is in AHRS and sees ~DAV asserted low (HSDS in FIG. 9D becomes active) and a "pmt" is detected, 2) the "lhs" local message becomes true, and 3) the AHE state machine performs the following state transitions:

AHRS→ACTS→ACRS→ACDS

The ~NDAC line is asserted low in ACTS and ACRS, and the SHE function waits for T17 in STRS until the AHE function gets to ACDS. When ACDS becomes active, DAC becomes true and RFD becomes false, and the SHE function transitions to SWNS, SGNS, and then SDYS. The AHE function proceeds to AWNS and to ANRS. The acceptor performs a not ready for data holdoff by keeping the "rdy" local message false and staying in ANRS.

The "tcs" local message may become true when the AHE function is in AHRS if this device is the active controller and it wants to assert ATN. The AHE function performs the following state transitions in this situation:

AHRS→ACTS→ACRS

The AHE function waits in ACRS until the device's controller function sends a command byte.

The AHE function has certain requirements for the generation of the "rdy" (ready) local message. If "rdy" is true when the AHE function enters ACRS, or if "rdy" becomes true while the AHE function is in ACRS, "rdy" is not allowed to go false until the AHE function enters ACDS. (This requirement is described in IEEE Std 488.1.) Since "rdy" is true until the AHE function enters ACDS, it must remain true in AHRS, AHNS, and ACTS. By forcing "rdy" to be true until the AHE function reaches ACDS, the acceptor can leave high speed mode and re-enter the normal handshake sequence in a synchronized manner.

Acceptor High Speed Not Ready State (AHNS): When the acceptor is in high speed mode, but its Data In Buffer is not ready to accept four or more bytes, the AHE function enters AHNS and asserts ~NDAC low to signal the sourcing device that it is not ready to accept more data. When the sourcing device receives the ~NDAC signal, it will stop sending additional data until the ~NDAC signal goes back high. Referring to FIG. 8A, it can be seen that the sourcing device will not be able to transition from STRS to SWNS when DAC is false. Thus, in AHNS the sourcing and acceptor devices remain in high speed mode, but the transmission of data by the sourcing device is temporarily stopped.

Acceptor High Speed Terminate State (ACTS): The AHE function transitions from AHNS to ACTS when either ATN becomes true or the "lhs" (leave high speed mode) local message becomes true. In ACTS the ~NDAC signal is pulled low by the AHE function. The AHE function waits in ACTS to make sure that the sourcing device has time to notice that ~NDAC is asserted and to make sure that any data bytes that were in the process of being sourced have all been received. After the delay, or if ATN is true, the AHE function transitions to the ACRS state, where normal interlocked data transmission resumes.

Figure 9B:
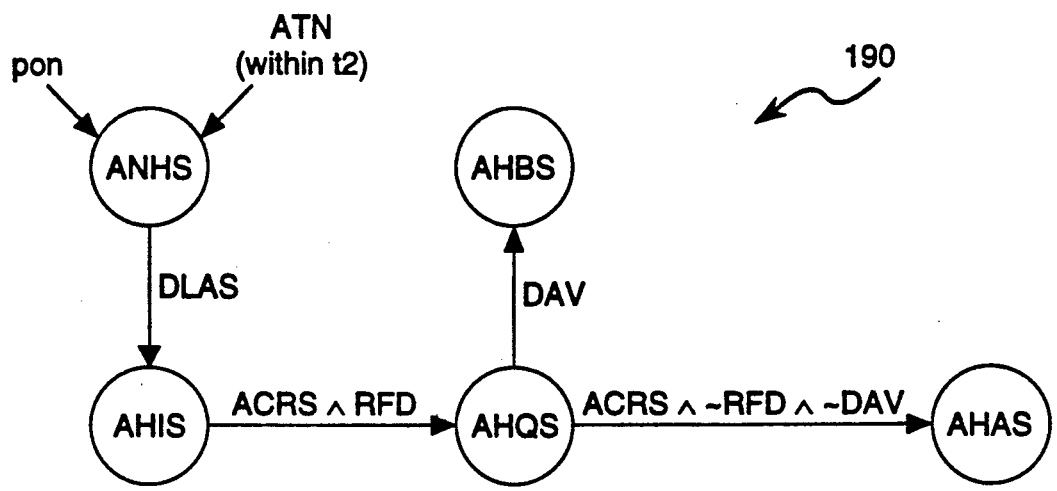
Figure 9C:
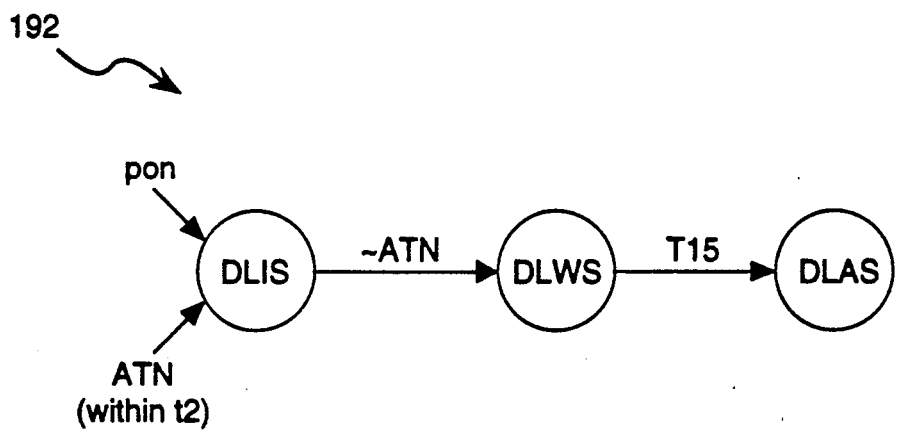

The purpose of the Delay State Machine 192 of FIG. 9C is to delay transition of the other state machines into high speed mode for a period specified by T15 (e.g., at least 250 nanoseconds) after ATN becomes false. Thus, at power on the Delay State Machine 192 enters the Delay Idle State (DLIS). When ATN becomes false, the Delay State Machine 192 transitions to Delay Wait State (DLWS), and then after a delay of T1 5 k transitions to Delay Active State (DLAS) as long as ATN has not been reasserted. Whenever ATN becomes active, the state machine reverts back to the Delay Idle State (DLIS).

The purpose of the Acceptor High Speed State Machine 190 of FIG. 9B is for the acceptor's AHE function to determine if the sourcing device is high speed capable. At power on, the Acceptor High Speed State Machine 190 enters the Acceptor High Speed Not Active State (ANHS). Once the Delay State Machine 192 enters DLAS the Acceptor High Speed State Machine 190 transitions to the Acceptor High Speed Idle State (AHIS), the purpose of which is to wait for all the acceptor devices to release the ~NRFD line prior to transmission of a data byte, which happens while the AHE function is in ACRS. At this point, the Acceptor High Speed State Machine 190 enters the Acceptor High Speed Query State (AHQS).

In AHQS the Acceptor High Speed State Machine 190 determines whether the source device is high speed capable. If the ~NRFD line is pulled low while DAV is still false, then the source device is high speed capable and the Acceptor High Speed State Machine 190 enters the Acceptor High Speed Active State (AHAS). If the source device is not high speed capable, DAV will become true without the criteria for AHAS having become true, and the Acceptor High Speed State Machine 190 will transition to the Acceptor High Speed Blocked State (AHBS), where d will remain until ATN transitions true and then false.

It should be noted that the acceptor device can enter the Acceptor High Speed Active State (AHAS) even if other acceptor devices are not high speed capable. The high speed capable acceptor will accept data bytes by tracking the ~DAV line, while the source device and the acceptor devices use the standard interlocked handshake for transferring data.

Figure 9D:
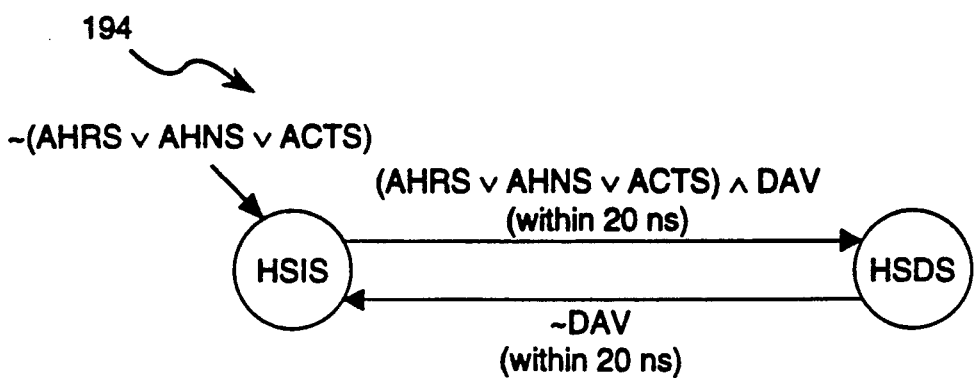

The purpose of the High Speed Data State Machine 194 in FIG. 9D is to track the DAV signal and to latch in each transmitted byte of data. This state machine starts out in the High Speed Idle State (HSIS) and returns to that state whenever the AHE function is not in any of the three high speed states AHRS, AHNS or ACTS. When the AHE function is in any of the three high speed states AHRS, AHNS or ACTS, it transitions to High Speed Data State (HSDS) within 20 nanoseconds when DAV is true, and transitions back to HSIS (within 20 nanoseconds) when DAV is false. The quick transitions between HSIS and HSDS are required due to the short length of the data valid pulse in high speed transfer mode. Whenever the High Speed Data State Machine 194 enters HSDS it latches the data currently on the DIO lines into its DIR register.

As mentioned above, the high speed data transmission mode of the present invention is totally transparent to the controller software (i.e., both the controller's device driver and application software) in that R does not require any changes to the controller software, and is also totally transparent to the device drivers and device application programs of the devices in which the invention is implemented. This "downward" compatibility of the present invention makes it easy to integrate new devices incorporating the present invention into existing systems having a number of devices that do not incorporate the present invention.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A bus interface that couples a first device to an IEEE 488 bus, said IEEE 488 bus including data lines, a data valid (DAV) line, a not-ready for data (NRFD) line, and a data accepted (DAC) line; said bus interface comprising:

an input/output port which transmits and receives data to and from said first device; and source handshake means, coupled to said IEEE 488 bus, for asserting a data message, comprising a sequence of data bytes from said first device via said input/output port, onto said data lines of said IEEE 488 bus, and for asserting a data valid signal on said DAV line in coordination with asserting said sequence of data bytes on said data lines of said IEEE 488 bus;

said source handshake means including source mode determination means (A) for automatically transmitting via said IEEE 488 bus, to specified acceptor devices coupled to said IEEE 488 bus, a high-speed-capable message that indicates that said bus interface is capable of high speed data transmissions, and (B) for monitoring said IEEE 488 bus for a predefined response signal indicating whether all of said specified acceptor device have bus interfaces capable of high speed data transmissions;

said source handshake means including source handshake state machine means for asserting said data valid signal on said DAV line using a first, low speed, data transmission protocol when said predefined response signal is not detected by said source mode determination means, and for asserting said data valid signal on said DAV line using a second, high speed, data transmission protocol when said predefined response signal is detected by said source mode determination means;

wherein said source handshake means automatically determines whether all of said specified acceptor devices have bus interfaces capable of high speed data transmission each time transmission of a data message begins;

said source handshake state machine means including first sourcing means for coordinating assertion of said data valid signal on said DAV line with interlock signals received from said specified acceptor devices on said NRFD line and DAC line when using said first, low speed, data transmission protocol, and second sourcing means for asserting and deasserting said data valid signal on said DAV line in a predefined pulsing pattern, so long as (A) said sequence of data bytes are available for transmission, and (B) said interlock signals are not received from said specified acceptor devices on said NRFD line and DAC line, when using said second, high speed, data transmission protocol;

said source mode determination means further including means for deactivating said second sourcing means and activating said first sourcing means when any of said specified acceptor devices transmits a terminate-high-speed-mode message via said IEEE 488 bus.

2. The bus interface of claim 1, said second sourcing means further including means for suspending transmission of further data bytes when any of said specified acceptor devices asserts a predefined suspend-transmission signal on one of said DAC and NRFD lines, and for resuming transmission of said further data bytes when said suspend-transmission signal on said one of said DAC and NRFD lines is deasserted.

3. A bus interface that couples a first device to an IEEE 488 bus, said IEEE 488 including data lines, a data valid (DAV) line, and a not-ready for data (NRFD) line; said bus interface comprising:

an input/output port which transmits and receives data to and from said first device; and source handshake means, coupled to said IEEE 488 bus, for asserting a data message, comprising a sequence of data bytes from said first device via said input/output port, onto said data lines of said IEEE 488 bus, and for asserting a data valid signal on said DAV line in coordination with asserting said sequence of data bytes on said data lines of said IEEE 488 bus;

said source handshake means including source mode determination means (A) for automatically transmitting via said IEEE 488 bus, to specified acceptor devices coupled to said IEEE 488 bus, a high-speed-capable message that indicates that said bus interface is capable of high speed data transmissions, and (B) for monitoring said IEEE 488 bus for a predefined response signal indicating whether all of said specified acceptor devices have bus interfaces capable of high speed data transmissions;

said source handshake means including source handshake state machine means for asserting said data valid signal on said DAV line using a first, low speed, data transmission protocol when said predefined response signal is not detected by said source mode determination means, and for asserting said data valid signal on said DAV line using a second, high speed, data transmission protocol when said predefined response signal is detected by said source mode determination means;

wherein said source handshake means automatically determines whether all of said specified acceptor devices have bus interfaces capable of high speed data transmission each time transmission of a data message begins;

said high-speed-capable message transmitted by said source mode determination means comprising a pulse of predefined duration on said NRFD line after asserting data on said data lines but prior to asserting a data valid signal on said DAV line.

4. A bus interface that couples a first device to an IEEE 488 bus, said IEEE 488 bus including data lines, a data valid (DAV) line, a not-ready for data (NRFD) line, and a data accepted (DAC) line; said bus interface comprising:

an input/output port which transmits and receives data to and from said first device; and source handshake means, coupled to said IEEE 488 bus, for asserting a data message, comprising a sequence of data bytes from said first device via said input/output port, onto said data lines of said IEEE 488 bus, and for asserting a data valid signal on said DAV line in coordination with asserting said sequence of data bytes on said data lines of said IEEE 488 bus;

said source handshake means including source mode determination means (A) for automatically transmitting via said IEEE 488 bus, to specified acceptor devices coupled to said IEEE 488 bus, a high-speed-capable message that indicates that said bus interface is capable of high speed data transmissions, and (B) for monitoring said IEEE 488 bus for a predefined response signal indicating whether all of said specified acceptor devices have bus interfaces capable of high speed data transmissions;

said source handshake means including source handshake state machine means for asserting said data valid signal on said DAV line using a first, low speed, data transmission protocol when said predefined response signal is not detected by said source mode determination means, and for asserting said data valid signal on said DAV line using a second, high speed, data transmission protocol when said predefined response signal is detected by said source mode determination means;

wherein said source handshake means automatically determines whether all of said specified acceptor devices have bus interfaces capable of high speed data transmission each time transmission of a data message begins;

listener circuit means, coupled to said input/output port and said IEEE 488 bus, for receiving a data message, comprising a sequence of data bytes, from said data lines of said IEEE 488 bus and transmitting said received sequence of data bytes to said first device via said input/output port; and acceptor handshake means, coupled to said listener circuit means and said IEEE 488 bus, for monitoring said DAV line to detect data valid signals thereon, and for coordinating reception of said sequence of data bytes from said data lines of said IEEE 488 bus with said data valid signals on said DAV line;

said acceptor handshake means including acceptor mode determination means for automatically monitoring said IEEE 488 bus to determine whether a specified sourcing device coupled to said IEEE 488 bus transmits said high-speed-capable message indicating that said specified sourcing device is capable of high speed data transmissions;

said acceptor handshake means including acceptor handshake state machine means (A) for asserting said interlock signals on said NRFD and DAC lines in coordination with said data valid signal on said DAV line for each said received data byte using said first, low speed, data transmission protocol when said high-speed-capable message is not detected by said acceptor mode determination means, and (B) for suppressing assertion of said interlock signals on said NRFD and DAC lines using said second, high speed, data transmission protocol when said high-speed-capable message is detected by said acceptor mode determination means;

wherein said acceptor handshake means automatically determines whether said specified sourcing device has a bus interface capable of high speed data transmission each time that a new data message is received by said bus interface coupled to said first device.

5. The bus interface of claim 4, said bus interface further including data in buffer means for temporarily storing said data bytes received by said listener circuit means prior to transmission thereof to said first device; said data in buffer means including monitoring means for generating a not-ready signal when said data in buffer means has less than a predefined amount of unused storage capacity;

said acceptor handshake means further including means for asserting a predefined suspend-transmission signal on one of said DAC and NRFD lines when said data in buffer means generates said not-ready signal, and for deasserting said suspend-transmission signal on said one of said DAC and NRFD lines when said data in buffer means stops generating said not-ready signal.

6. The bus interface of claim 5, said acceptor handshake means including means for transmitting a terminate-high-speed-mode message to said specified sourcing device via said IEEE 488 bus, said acceptor handshake state machine means including means for using said first, low speed, data transmission protocol a predefined time interval after transmission of said terminate-high-speed-mode message by said acceptor handshake means.

7. The bus interface of claim 4,
said high-speed-capable message transmitted by said specified source device comprising a pulse of predefined duration on said NRFD line prior to said acceptor handshake means detecting a data valid signal on said DAV line.

8. A bus interface that couples a first device to an IEEE 488 bus, said IEEE 488 bus including data lines, a data valid (DAV) line, a not-ready for data (NRFD) line, and a data accepted (DAC) line; said bus interface comprising:
an input/output port which transmits and receives data to and from said first device;
listener circuit means, coupled to said input/output port and said IEEE 488 bus, for receiving a data message, comprising a sequence of data bytes, from said data lines of said IEEE 488 bus and transmitting said received sequence of data bytes to said first device via said input/output port; and
acceptor handshake means, coupled to said listener circuit means and said IEEE 488 bus, for monitoring said DAV line to detect data valid signals thereon, and for coordinating reception of said sequence of data bytes from said data lines of said IEEE 488 bus with said data valid signals on said DAV line;
said acceptor handshake means including acceptor mode determination means for automatically monitoring said IEEE 488 bus to determine whether a specified sourcing device coupled to said IEEE 488 bus transmits said high-speed-capable message indicating that said specified sourcing device is capable of high speed data transmissions;
said acceptor handshake means including acceptor handshake state machine means (A) for asserting said interlock signals on said NRFD and DAC lines in coordination with said data valid signal on said DAV line for each said received data byte using a first, low speed, data transmission protocol when said high-speed-capable message is not detected by said acceptor mode determination means, and (B) for suppressing assertion of said interlock signals on said NRFD and DAC lines using said second, high speed, data transmission protocol when said high-speed-capable message is detected by said acceptor mode determination means;
wherein said acceptor handshake means automatically determines whether said specified sourcing device has a bus interface capable of high speed data transmission each time that a new data message is received by said bus interface coupled to said first device;
said acceptor handshake means including means for transmitting a terminate-high-speed-mode message to said specified sourcing device via said IEEE 488 bus, said acceptor handshake state machine means including means for using said first, low speed, data transmission protocol a predefined time interval after transmission of said terminate-high-speed-mode message by said acceptor handshake means.

9. The bus interface of claim 8,
said bus interface further including data in buffer means for temporarily storing said data bytes received by said listener circuit means prior to transmission thereof to said first device; said data in buffer means including monitoring means for generating a not-ready signal when said data in buffer means has less than a predefined amount of unused storage capacity;
said acceptor handshake means further including means for asserting a predefined suspend-transmission signal on one of said DAC and NRFD lines when said data in buffer means generates said not-ready signal, and for deasserting said suspend-transmission signal on said one of said DAC and NRFD lines when said data in buffer means stops generating said not-ready signal.

10. A bus interface that couples a first device to an IEEE 488 bus, said IEEE 488 bus including data lines, a data valid (DAV) line, a not-ready for data (NRFD) line, and a data accepted (DAC) line; said bus interface comprising:
an input/output port which transmits and receives data to and from said first device;
listener circuit means, coupled to said input/output port and said IEEE 488 bus, for receiving a data message, comprising a sequence of data bytes, from said data lines of said IEEE 488 bus and transmitting said received sequence of data bytes to said first device via said input/output port; and
acceptor handshake means, coupled to said listener circuit means and said IEEE 488 bus, for monitoring said DAV line to detect data valid signals thereon, and for coordinating reception of said sequence of data bytes from said data lines of said IEEE 488 bus with said data valid signals on said DAV line;
said acceptor handshake means including acceptor mode determination means for automatically monitoring said IEEE 488 bus to determine whether a specified sourcing device coupled to said IEEE 488 bus transmits said high-speed-capable message indicating that said specified sourcing device is capable of high speed data transmissions;
said acceptor handshake means including acceptor handshake state machine means (A) for asserting said interlock signals on said NRFD and DAC lines in coordination with said data valid signal on said DAV line for each said received data byte using a first, low speed, data transmission protocol when said high-speed-capable message is not detected by said acceptor mode determination means, and (B) for suppressing assertion of said interlock signals on said NRFD and DAC lines using said second, high speed, data transmission protocol when said high-speed-capable message is detected by said acceptor mode determination means;

wherein said acceptor handshake means automatically determines whether said specified sourcing device has a bus interface capable of high speed data transmission each time that a new data message is received by said bus interface coupled to said first device;

said high-speed-capable message transmitted by said specified source devices comprising a pulse of predefined duration on said NRFD line prior to said acceptor handshake means detecting a data valid signal on said DAV line.

11. In a system having a plurality of devices coupled to an IEEE 488 bus, said IEEE 488 bus including data lines, a data valid (DAV) line, a not-ready for data (NRFD) line, and a data accepted (DAC) line; wherein any one said plurality of devices can be specified to be a sourcing device and any other ones of said plurality of devices can be specified to be acceptor devices for purposes of transmitting a data message from the specified sourcing device to the specified acceptor devices; the combination comprising:

a first bus interface, associated with a first one of said plurality of devices, that couples said first device to said IEEE 488 bus; said first bus interface including:

an input/output port which transmits and receives data to and from said first device;

source handshake means, coupled to said IEEE 488 bus, for asserting a data message, comprising a sequence of data bytes from said first device via said input/output port, onto said data lines of said IEEE 488 bus, and for asserting a data valid signal on said DAV line in coordination with asserting said sequence of data bytes on said data lines of said IEEE 488 bus;

said source handshake means including source mode determination means (A) for automatically transmitting via said IEEE 488 bus, to specified acceptor devices coupled to said IEEE 488 bus, a high-speed-capable message that indicates that said bus interface is capable of high speed data transmissions, and (B) for monitoring said IEEE 488 bus for a predefined response signal indicating whether all of said specified acceptor devices have interfaces capable of high speed data transmissions;

said source handshake means including source handshake state machine means for asserting said data valid signal on said DAV line using a first, low speed, data transmission protocol when said predefined response signal is not detected by said source mode determination means, and for asserting said data valid signal on said DAV line using a second, high speed, data transmission protocol when said predefined response signal is detected by said source mode determination means;

said high-speed-capable message transmitted by said source mode determination means comprising a pulse of predefined duration on said NRFD line after asserting data on said data lines but prior to asserting a data valid signal on said DAV line;

wherein said source handshake means automatically determines whether all of said specified acceptor devices have bus interfaces capable of high speed data transmission each time transmission of a data message begins; and a second bus interface, associated with a second one of said plurality of devices, that couples said second device to said IEEE 488 bus; said second bus interface including:

an input/output port which transmits and receives data to and from said first device;

listener circuit means, coupled to said input/output port and said IEEE 488 bus, for receiving a data message, comprising a sequence of data bytes, from said data lines of said IEEE 488 bus and transmitting said received sequence of data bytes to said second device via said input/output port; and acceptor handshake means, coupled to said listener circuit means and said IEEE 488 bus, for monitoring said DAV line to detect data valid signals thereon, and for coordinating reception of said sequence of data bytes from said data lines of said IEEE 488 bus with said data valid signals on said DAV line;

said acceptor handshake means including acceptor mode determination means for automatically monitoring said IEEE 488 bus to determine whether a specified sourcing device coupled to said IEEE 488 bus transmits said high-speed-capable message indicating that said specified sourcing device is capable of high speed data transmissions;

said acceptor handshake means including acceptor handshake state machine means (A) for asserting said interlock signals on said NRFD and DAC lines in coordination with said data valid signal on said DAV line for each said received data byte using said first, low speed, data transmission protocol when said high-speed-capable message is not detected by said acceptor mode determination means, and (B) for suppressing assertion of said interlock signals on said NRFD and DAC lines using said second, high speed, data transmission protocol when said high-speed-capable message is detected by said acceptor mode determination means;

wherein said acceptor handshake means automatically determines whether said specified sourcing device has bus interface capable of high speed data transmission each time that a new data message is received by said second bus interface.

12. The combination of claim 11;

said first bus interface having means for enabling said source handshake means only when said first device is said specified sourcing device; and said second bus interface having means for enabling said acceptor handshake means only when said second device is one of said specified acceptor devices.

13. The combination of claim 11, said source handshake state machine means including
first sourcing means for coordinating assertion of said data valid signal on said DAV line with interlock signals received from said specified acceptor devices on said NRFD line and DAC line when using said first, low speed, data transmission protocol, and second sourcing means for asserting and deasserting said data valid signal on said DAV line in a predefined pulsing pattern, so long as (A) said sequence of data bytes are available for transmission, and (B) said interlock signals are not received from said specified acceptor devices on said NRFD line and DAC line, when using said second, high speed, data transmission protocol.

14. The combination of claim 13,
said second sourcing means further including means for suspending transmission of further data bytes when any of said specified acceptor devices asserts a predefined suspend-transmission signal on one of said DAC and NRFD lines, and for resuming transmission of said further data bytes when said suspend-transmission signal on said one of said DAC and NRFD lines is deasserted.

15. The combination of claim 14, said source mode determination means further including means for deactivating said second sourcing means and activating said first sourcing means when any of said specified acceptor devices transmits a terminate-high-speed-mode message via said IEEE 488 bus.

16. A method of transmitting a data message, comprising a sequence of data bytes from a sourcing device to specified acceptor devices via an IEEE 488 bus, said IEEE 488 bus including data lines and a data valid (DAV) line; the steps of the method comprising:
a first bus interface, coupling said sourcing device to said IEEE 488 bus, asserting said sequence of data bytes onto said data lines of said IEEE 488 bus;
said first bus interface asserting a data valid signal on said DAV line in coordination with said step of asserting said sequence of data bytes on said data lines of said IEEE 488 bus;
said first bus interface automatically transmitting via said IEEE 488 bus, to said specified acceptor devices a high-speed-capable message that indicates that said first bus interface is capable of high speed data transmissions, and then monitoring said IEEE 488 bus for a predefined response signal indicating whether all of said specified acceptor devices have bus interfaces capable of high speed data transmissions;
said first bus interface asserting said data valid signal on said DAV line using a first, low speed, data transmission protocol when said predefined response signal is not detected by said monitoring step; and
said first bus interface asserting said data valid signal on said DAV line using a second, high speed, data transmission protocol when said predefined response signal is detected by said monitoring step;
further including ceasing use of said second, high speed, data transmission protocol and initiating use of said first, low speed, data transmission protocol when any of said specified acceptor devices transmits a terminate-high-speed-mode message via said IEEE 488 bus.

17. The method of claim 16,
said first bus interface, when using said second, high speed, data transmission protocol, further performing the steps of suspending transmission of further data bytes when any of said specified acceptor devices asserts a predefined suspend-transmission signal on one of said DAC and NRFD lines, and resuming transmission of said further data bytes when said suspend-transmission signal on said one of said DAC and NRFD lines is deasserted.

18. A method of transmitting a data message, comprising a sequence of data bytes from a sourcing device to specified acceptor devices via an IEEE 488 bus, said IEEE 488 bus including data lines, a not-ready for data (NRFD) line, and a data valid (DAV) line; the steps of the method comprising:
a first bus interface, coupling said sourcing device to said IEEE 488 bus, asserting said sequence of data bytes onto said data lines of said IEEE 488 bus;
said first bus interface asserting a data valid signal on said DAV line in coordination with said step of asserting said sequence of data bytes on said data lines of said IEEE 488 bus;
said first bus interface automatically transmitting via said IEEE 488 bus, to said specified acceptor devices a high-speed-capable message that indicates that said first bus interface is capable of high speed data transmissions, and then monitoring said IEEE 488 bus for a predefined response signal indicating whether all of said specified acceptor devices have bus interfaces capable of high speed data transmissions;
said step of transmitting said high-speed-capable message including transmitting a pulse of predefined duration on said NRFD line prior to asserting a data valid signal on said DAV line;
said first bus interface asserting said data valid signal on said DAV line using a first, low speed, data transmission protocol when said predefined response signal is not detected by said monitoring step; and
said first bus interface asserting said data valid signal on said DAV line using a second, high speed, data transmission protocol when said predefined response signal is detected by said monitoring step.

19. The method of claim 18,
said first bus interface coordinating assertion of said data valid signal on said DAV line with interlock signals received from said specified acceptor devices on said NRFD line and DAC line when using said first, low speed, data transmission protocol, and
said first bus interface asserting and deasserting said data valid signal on said DAV line in a predefined pulsing pattern, so long as (A) said sequence of data bytes are available for transmission, and (B) said interlock signals are not received from said specified acceptor devices on said NRFD line and DAC line, when using said second, high speed, data transmission protocol.

20. A method of transmitting a data message, comprising a sequence of data bytes from a sourcing device to specified acceptor devices via an IEEE 488 bus, said IEEE 488 bus including data lines, a not-ready for data (NRFD) line, a data valid (DAV) line, and a data accepted (DAC) line; the steps of the method comprising:
a first bus interface, coupling said sourcing device to said IEEE 488 bus, asserting said sequence of data bytes onto said data lines of said IEEE 488 bus;
said first bus interface asserting a data valid signal on said DAV line in coordination with said step of asserting said sequence of data bytes on said data lines of said IEEE 488 bus;
said first bus interface automatically transmitting via said IEEE 488 bus, to said specified acceptor devices a high-speed-capable message that indicates that said first bus interface is capable of high speed data transmissions, and then monitoring said IEEE 488 bus for a predefined response signal indicating whether all of said specified acceptor devices have bus interfaces capable of high speed data transmissions;

said first bus interface asserting a data valid signal on said DAV line using first, low speed, data transmission protocol when said predefined response signal is not detected by said monitoring step; and said first bus interface asserting said data valid signal on said DAV line using a second, high speed, data transmission protocol when said predefined response signal is detected by said monitoring step;

a second bus interface, coupling one of said specified acceptor devices to said IEEE 488 bus, receiving said sequence of data bytes from said data lines of said IEEE 488 bus, and transmitting said received sequence of said data bytes to said one acceptor device;

said second bud interface detecting data valid signals on said DAV line and coordinating said receiving of said sequence of data bytes from said data lines of said IEEE 488 bus with said data valid signals on said DAV line;

said second bus interface automatically monitoring said IEEE 488 bus to determined whether said sourcing device coupled to said IEEE 488 bus transmits said high-speed-capable message indicating that said specified sourcing device is capable of high speed data transmissions;

said second bud interface asserting said interlock signals on said NRFD and DAC lines in coordination with said data valid signal on said DAV line for each said received data byte using said first, low speed, data transmission protocol when said monitoring step does not detect said high-speed-capable message;

said second bus interface suppressing assertion of said interlock signals on said NRFD and DAV lines using said second, high speed, data transmission protocol when said monitoring step detects said high-speed-capable message;

said second bus interface means, upon receiving a leave-high-speed-mode command from said one acceptor device, transmitting a terminate-high-speed-mode message to said sourcing device via said IEEE 488 bus, and then, a predefined time interval after transmitting said terminate-high-speed-mode message, using said first, low speed, data transmission protocol while receiving further data bytes.

21. The method of claim 20, said second bus interface temporarily storing said received data bytes in a buffer prior to transmission thereof to said one acceptor device, asserting a predefined suspend-transmission signal on one of said DAC and NRFD lines when said buffer has less than a predefined amount of unused storage capacity, and deasserting said suspend-transmission signal on said one of said DAC and NRFD lines when said buffer has at least said predefined amount of unused storage capacity.

* * * * *